(12) United States Patent
Hudson

(10) Patent No.: US 7,180,015 B2
(45) Date of Patent: Feb. 20, 2007

(54) SCALE WITH CLAMPABLE PROTRUSION FOR WEIGHING BICYCLES AND OTHER SPORTS-RELATED ITEMS

(76) Inventor: Douglas A. Hudson, 19348 W. 56th La., Golden, CO (US) 80403

( * ) Notice: Subject to any disclaimer, the term of this patent is extended or adjusted under 35 U.S.C. 154(b) by 0 days.

(21) Appl. No.: 11/223,424

(22) Filed: Sep. 9, 2005

(65) Prior Publication Data

US 2006/0065448 A1    Mar. 30, 2006

Related U.S. Application Data

(60) Provisional application No. 60/612,985, filed on Sep. 24, 2004.

(51) Int. Cl.
*G01G 19/52* (2006.01)
*A47F 7/00* (2006.01)
*B25B 1/20* (2006.01)

(52) U.S. Cl. ............ 177/131; 177/148; 177/245; 211/17; 211/22; 269/86

(58) Field of Classification Search .......... 211/17, 211/22; 177/131, 148–149, 245; 269/86
See application file for complete search history.

(56) References Cited

U.S. PATENT DOCUMENTS

| 2,586,245 | A | * | 2/1952 | McRae | 177/131 |
| 2,990,899 | A | * | 7/1961 | De Bella | 177/139 |
| 3,981,491 | A | * | 9/1976 | Snyder | 269/64 |
| 4,441,568 | A | * | 4/1984 | Heffner | 177/129 |
| 4,660,666 | A | * | 4/1987 | Reder et al. | 177/148 |
| 5,031,710 | A | * | 7/1991 | Parker et al. | 177/210 FP |
| 5,119,585 | A | * | 6/1992 | Camp | 43/53.5 |
| 6,696,650 | B2 | * | 2/2004 | Muller et al. | 177/148 |

FOREIGN PATENT DOCUMENTS

DE    AT 398001 A    * 12/1993

OTHER PUBLICATIONS

Published Abstract No. TW 223633 B (Juang) Nov. 11, 2004.*

* cited by examiner

*Primary Examiner*—Randy W. Gibson
(74) *Attorney, Agent, or Firm*—Kurt Leyendecker; Leyendecker and Lemire, LLC

(57) ABSTRACT

A scale for weighing objects in general and specifically bicycles is described. One embodiment of the scale comprises a body, a hook for suspending the item to be weighed, and an appendage extending from the body. The appendage is adapted to be firmly secured in a tube clamp of a typical bicycle repair stand to hold the scale while a bicycle or other objects are being weighed.

20 Claims, 2 Drawing Sheets

SCALE WITH CLAMPABLE PROTRUSION FOR WEIGHING BICYCLES AND OTHER SPORTS-RELATED ITEMS

RELATED APPLICATIONS

This application claims priority to the provisional application No. 60/612,985 filed on Sep. 24, 2004 having the same name and the same inventor as this application.

FIELD OF THE INVENTION

This invention relates generally to scales, and more particularly, to scales from which an item is suspended.

BACKGROUND OF THE INVENTION

Various types of scales are known in the art from which an item is suspended to be weighed. The more common hanging scales include analog grocery scales adapted to weigh meat and or produce, and fish scales. Typically, these scales are suspended from overhead and include either a tray or hook that is suspended from their bottom side on which the item is placed or hung. Fish scales, which are designed to weigh fish and other items that are relatively low in weight, are often held from above by the user. Finding a place to suspend one of the scales adapted to hold higher weights can be problematic. In a commercial building or a garage, the ceilings are often too high and in residential settings the hooks or other fasteners must be permanently or semi-permanently secured to the ceiling through drywall. Stands are available or can be fabricated to hold grocery type scales but they tend to be very heavy and expensive.

One group of people that often have a high degree of interest in weighing their gear is bicycle enthusiasts and racers (collectively referred to as cyclists herein). The weight of a cyclist's bicycle has a direct effect on the speed at which he/she can accelerate or climb hills. Accordingly, cyclists are constantly looking for ways to reduce the weight of their bicycles. Unfortunately, traditional scales are not well suited for weighing bicycles. Fish scales typically do not have capacities beyond 25 pounds. Grocery scales are generally cost prohibitive for at home use and often do not have the degree of precision desired by cyclists, although some bike shops have adapted such scales for use in weighing bicycles.

Typically, the cyclist is relegated to using his/her bathroom scale to weigh his/her bicycle. However, these scales provide digital or analog readouts in one pound increments, and even worse, have much higher error tolerances. In other words, they give a cyclist a rough idea of the weight of his/her bike but not the net effect of swapping particular components for other components.

One solution for the cyclist is the Prepstand Pro by Topeak of Cycling Accessories of New York. It comprises a repair stand with an integrated scale that provides the weight of the bicycle or other item clamped thereto. While this product is suitable for use at home, it is relatively expensive. Furthermore, it is not a convenient solution for cyclists that already own a repair stand. Finally, the scale portion cannot be separated from the stand portion, preventing a user from conveniently placing the scale in a bag or his car to transport to other locations.

SUMMARY OF THE INVENTION

In one embodiment of the invention, a scale is described that includes: (i) a body; (ii) a hook or other implement that hangs from the body to which a bicycle or other items, such as but not limited to backpacks, can be suspended; and (iii) an appendage protruding from the body that is adapted to be clamped in one or both of a tube clamp, such as used on a bicycle stand, and a vise without permanent deformation that would be detrimental to the scale's present or future operation. In one variation, the scale is electronic using a strain gauge to measure weight suspended from the scale. In another variation, the scale's body includes an elastomeric or semi-elastomeric protective outer covering to protect the body from damage. In yet other variations, the appendage is generally cylindrical and extends from a bottom end of the body wherein the hook protrudes from a bottom end of the cylindrical appendage. A notch can also be provided proximate the bottom end of the cylindrical appendage to permit the hook to be pivoted rearwardly and upwardly to facilitate more efficient packaging. In yet other variations, the hook is coupled to a strain gauge by a flexible chain. The chain also permits the hook to be pivoted back up against the appendage to facilitate packaging.

In another embodiment of the invention, a bike scale in combination with a bicycle repair stand is described. Variations of the bicycle repair stand include a tube clamp adapted to secure a tubular section of a bicycle thereto. The scale and the stand include means for removably attaching the scale to the stand for weighing a bicycle or other items of interest.

In yet another embodiment, a method of weighing a bicycle is described. The method comprises (i) removably attaching the scale to a bicycle repair stand; (ii) hooking or otherwise coupling the bicycle to the scale; and (iii) reading the weight of the bicycle.

DETAILED DESCRIPTION

Figure 1:
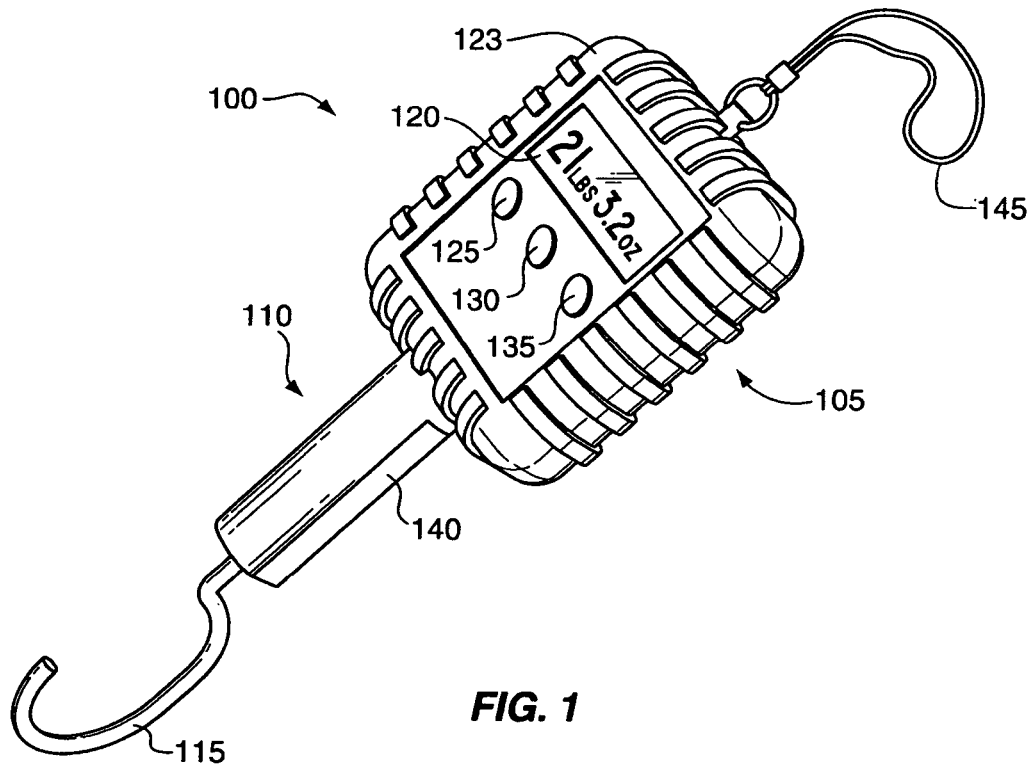
FIG. 1 is an isometric front view of the scale according to one embodiment of the present invention.

One embodiment of the present invention comprises a scale adaptable for removably coupling to a bicycle repair stand which easily permits a user to weigh a bicycle or other items, such as but not limited to outdoor equipment, backpacks, and sports equipment. In variations of the scale, it includes a protrusion (or appendage) that is adapted to permit the scale to be clamped and secured in the tube clamp of a typical repair stand or a traditional vise without damaging the scale or hindering its ability to perform its intended function. In certain variations, a hook or other attachment means is provided, such as but not limited to clamps, straps and brackets, from which the bicycle or other items to be weighed can be suspended. In yet another variation, the protrusion is tubular and the hook extends from the distal end of the protrusion.

Embodiments of the scale typically are electronic with the circuitry housed in a suitable body, although other embodiments can utilize a mechanical mechanism to determine weight. In the electronic embodiments, a digital readout is provided on a front face of the body along with various buttons for accomplishing such functions as turning the scale off and on, taring the scale, and choosing the units of weight measure. In variations, the body can include an elastomeric or semi-elastomeric covering designed to absorb impact loads on the body to prevent damage thereto.

Operationally, the scale can be used in several different ways: (i) a user can hold the scale from a provided strap and suspend the item to be weighed from the hook in a manner similar to how a fish scale is used; (ii) the user hold the scale in his/her hand by griping the protrusion and suspending the item from the hook; (iii) the user can suspend the scale from overhead by looping the strap around a suitable fixture, such as a ceiling hook or the limb of a tree and then suspend the item from the hook; (iv) the user can secure the protrusion in a traditional vise and then suspend the item from the hook; and (v) the user can secure the protrusion in a tube clamp as is found on many bicycle repair stands and then suspend the item from the hook.

The advantages of the embodiments described herein above and below along with the particular configuration of the described embodiment(s) of the invention are not conclusive or even exhaustive but rather merely representative of the best mode of using the invention. Rather, numerous variations and other embodiments have been contemplated.

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment", "one variation", "a variation" and similar phrases mean that a particular feature, structure, or characteristic described in connection with the embodiment or variation is included in at least an embodiment or variation of the invention. The phrase "in one embodiment", "in one variation" or similar phrases as used in various places in the specification are not necessarily meant to refer to the same embodiment or the same variation.

The term "couple" or "coupled" as used in this specification and the appended claims refers to either an indirect or direct connection between the identified elements, components or objects. Often the manner of the coupling will be related specifically to the manner in which the two coupled elements interact.

The use of the term "hook" herein refers to any element over or into which an item can be placed and be suspended therefrom.

A Clampable Scale

Figure 2:
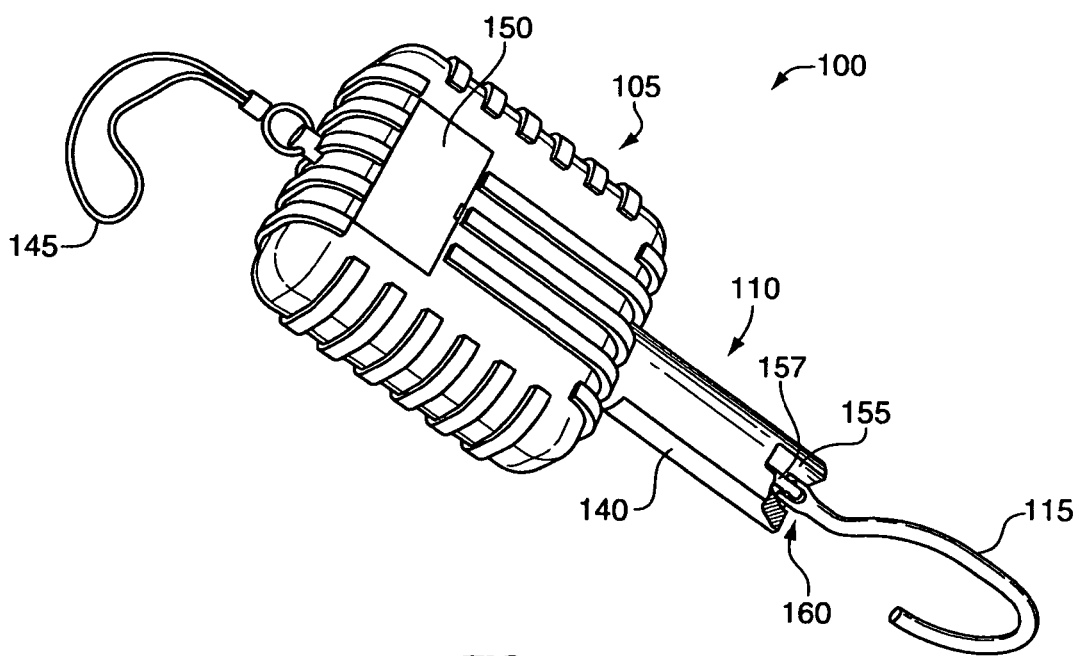
FIG. 2 is an isometric rear view of the scale according to one embodiment of the present invention wherein a small portion of the distal end of the tubular protrusion is cutaway for clarity.

Referring to FIGS. 1 and 2, one embodiment of a scale is illustrated. The scale generally comprises: (i) a body 105 including electronics (not shown); (ii) a generally cylindrical tubular protrusion 110 extending from a bottom end of the body; and (iii) a hook 115 extending from the distal end of the protrusion from which an item to be weighed can be suspended. The illustrated embodiment preferably has a 50 pound capacity and although in other embodiments and variations the capacity of the scale can vary.

The body 105 typically comprises a rigid plastic material, such as but not limited to ABS, in which the electronic circuitry of the scale is housed. The electronics (not shown) are conventional as would be known in the art and utilize a strain gauge (or a similar type of transducer) coupled with the hook to measure weight. Although the strain gauge is typically located in the body with the other electronics, in variations it can also be located within the tubular protrusion and electronically coupled to the other electronics by way of a wire or other electrical traces. A replaceable battery is also typically contained in the body, which is accessible by way of a battery compartment door 150 on the body's backside.

An elastomeric or semi-elastomeric material 123 (typically rubber or synthetic rubber) is over-molded around the rigid plastic body. It is appreciated that the scale can be kept in a tool box wherein it will be jostled around and make contact with other tools during transport. Further, it is possible that the unit may be dropped occasionally when secured to and removed from a vise or bicycle repair stand. Accordingly, the overmolded elastomeric material provides additional impact resistance to the scale helping to protect both the body and electronics.

The front side of the body 105 includes a digital display 120, which typically comprises an LCD panel. The LCD panel typically displays the weight of the item being weighed in either pounds or kilograms. In one variation, the display indicates kilograms with a resolution of ten grams and pounds with a resolution of about 0.02 lbs. The electronics, however, preferably provides a minimum accuracy level of either +−30 grams or about one ounce. Also included on the front side is a plurality of buttons 125, 130 & 135 or other type switches. One button 125 is provided for turning the unit on or off, although the electronics in certain variations will turn off the scale automatically after a period of non-use, such as 30 minutes. Another button 130 is provided to tare or zero the scale prior to suspending the item to be weighed from the hook. Finally, a third button 135 is provided to switch the digital display between pound and kilograms.

A boss typically extends from the top side of the scale body 105 with a ring and associated strap 145, typically comprised of nylon webbing, attached thereto. In some variations, the strap can be coupled directly to the boss. The strap can be used for conveniently carrying the scale or it can be used to suspend the scale from a suitable fixture or a user's hand when weighing items.

The cylindrical protrusion 110 is tubular and extends from the bottom side of the body and is firmly secured to the body 105 at its distal end. The protrusion is typically comprised of a metallic material such as aluminum or steel and has a wall thickness sufficient to prevent it permanently deforming or crushing when tightened in a vice or a bicycle tube clamp enough such that at least 50 pounds can be suspended from the hook 115. In one variation, the protrusion is about four inches long and one inch in diameter and has a wall thickness of about 0.025–0.060" when comprised of steel (including stainless steel) and 0.060–0.125 when comprised of an aluminum alloy, although protrusions of other dimensions can be used as well. In the illustrated embodiment, two longitudinally extending directly opposed flat sections 155 are provided on the outside surface of the protrusion. These sections provided additional clamping surface area to be used when the scale is clamped in to a traditional flat sided vice as opposed to a bicycle tube clamp. It is to be appreciated that in other embodiments and variations that the protrusion is substantially cylindrical with no vise flat sections 155 provided.

The hook 115 extends out of the distal end of the tubular protrusion 110. A shank (not illustrated) of the hook or a shaft 157 that is coupled with the top of the hook extends upwardly in the interior of the tube and is operatively coupled with the strain gauge. The hook is typically comprised of steel rod and is roughly two inches in diameter and has a generally upwardly facing two inch wide opening over which the item of to be weighed can be placed. In other variations, the shaft is replaced by a flexible chain that is coupled on one end to the strain gauge and on the other end to the hook. In yet other variations, the hook and the shaft are coupled together by an intervening chain.

Referring specifically to FIG. 2, an approximately ½ inch wide and 0.75" long slot 155 extends upwardly from the distal end of the protrusion 110. Also the hook 115 is attached to the aforementioned shaft 157 by way of a pivotal connection 160 proximate the distal end of the protrusion. In combination, the slot and pivotal connection permit the hook to be folded back behind the post to facilitate packaging of the scale. In the variations using a flexible chain in place of the shaft, no slot is required to permit the hook to be folded back as the chain has both sufficient length and flexibility.

Figure 3:
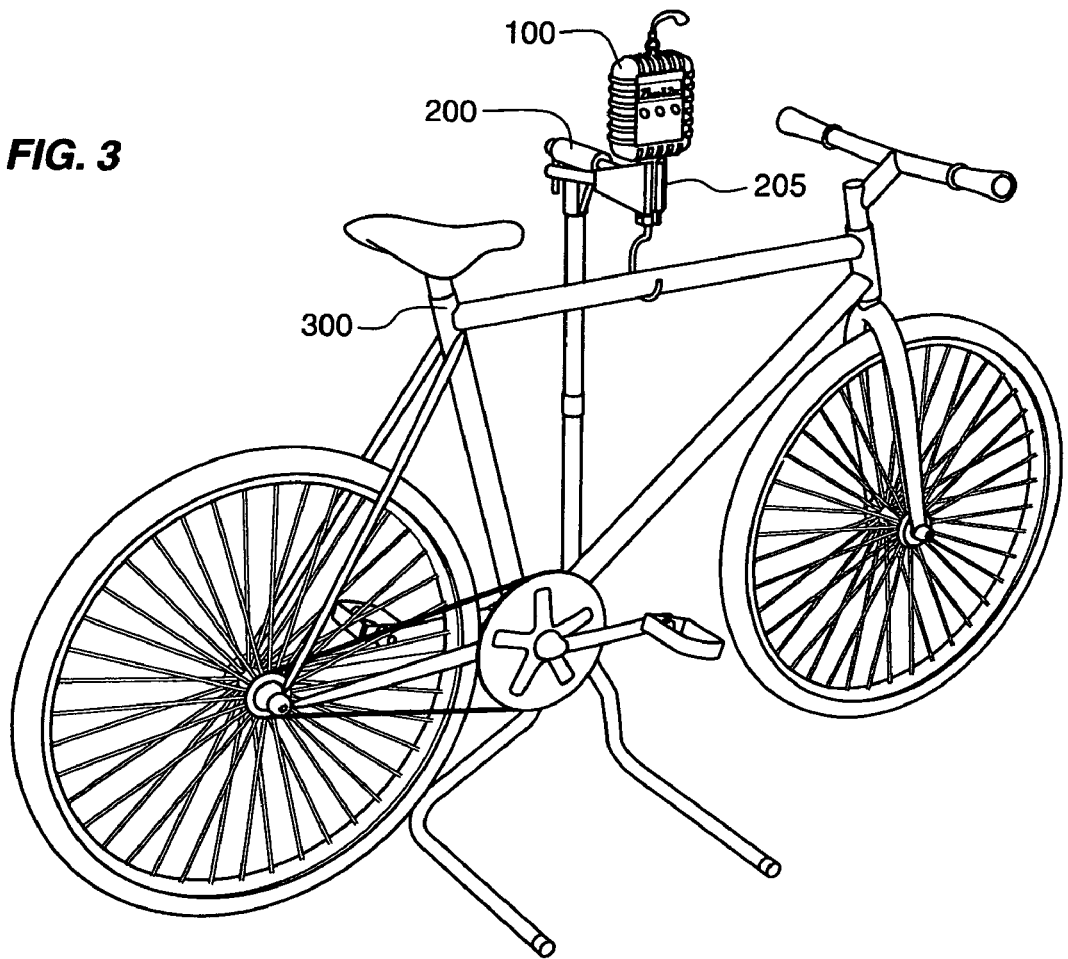
FIG. 3 is an isometric view showing the scale secured in a tube clamp of a bicycle stand with a bicycle suspended from the scale for weighing according to one embodiment of the present invention.

Referring to FIG. 3, the scale 100 is shown clamped into a tube clamp 205 of a bicycle repair stand 200 at the cylindrical protrusion with a bicycle 300 suspended from the hook.

A Method of Weighing a Bicycle

Figure 4:
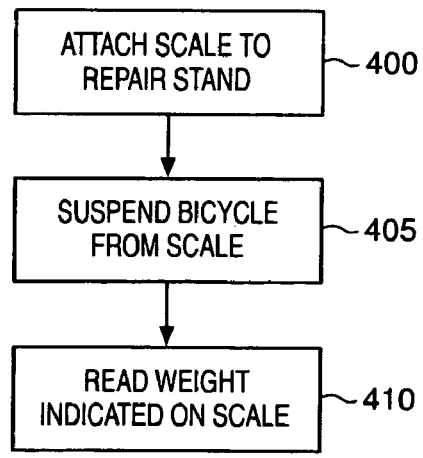
FIG. 4 is a flow chart concerning a method of weighing a bicycle.

Referring to FIG. 4, a method for weighing a bicycle is described. First as indicated in block 400, a user removably attaches the scale to the bicycle stand, such as but not limited to, clamping a scale similar to the embodiment of FIGS. 1 & 2 into the stand's tube clamp. Depending on the design of the scale, the user may tare the scale. Next, as indicated in block 405, the user suspends or otherwise supports the bicycle from or on the scale. Finally, the user reads the weight of the bicycle as indicated in block 410.

Using another methodology, the user first weighs the bicycle prior to adding, removing or switching a component of the bicycle. He/she then tares the scale before removing the bicycle to zero the scale at the weight of the bicycle prior to the change. The bicycle is then removed from the scale and the desired change, such as adding new component, is made. Alternatively, the user can make the change to the bicycle as it remains attached to the scale. Accordingly, once the change is made and the bicycle is reweighed, the scale will indicate the net change in the weight of the bicycle.

Alternative Embodiments and Variations

The various embodiments and variations thereof illustrated in the accompanying Figures and/or described above are merely exemplary and are not meant to limit the scope of the invention. It is to be appreciated that numerous variations of the invention have been contemplated as would be obvious to one of ordinary skill in the art with the benefit of this disclosure. For instance in alternative embodiments, the protrusion need not extend from the bottom side of the body, nor does the protrusion have to be cylindrical or tubular. The hook or other attachment mechanisms can extend directly from the body with the protrusion being located and extending from another side of the body. Further, the actual configuration of the body, the display panel and the buttons can vary substantially while still retaining the functionality described and detailed herein.

I claim:

1. A scale for weighing objects, the scale comprising:
a body, the body having a top side and a bottom side and including (i) a weighing mechanism, and (ii) a display;
a hook coupled with the body; and
an appendage extending from the body, the appendage adapted to be clamped in a tube clamp of a bicycle stand tight enough wherein at least 50 pounds can be supported by the scale though the vice without the appendage incurring damage, the appendage being generally cylindrical and comprised of a metallic material.

2. The scale of claim 1, wherein the appendage is generally tubular and includes an interior, the appendage extending downwardly from the bottom side and the hook extending from a distal end of the appendage and being coupled with the body through the interior.

3. The scale of claim 2, wherein the hook is coupled to the body by way of a chain or a shaft, the chain or shaft extending though the interior.

4. The scale of claim 3, wherein the weighing mechanism includes a strain gauge, the strain gauge being wholly contained within the body.

5. The scale of claim 1, wherein a least a portion of the body is covered with an over-molding of an elastomeric or semi-elastomeric polymeric material.

6. The scale of claim 1, wherein a strap loop is coupled to the top side.

7. The scale of claim 2, wherein the appendage is comprised of an aluminum alloy and has a wall thickness of 0.060"–0.125".

8. The scale of claim 2, wherein the appendage is comprised of stainless steel and has a wall thickness of 0.025"–0.060".

9. The scale of claim 1, wherein the scale has a capacity of at least 50 pounds and an accuracy of plus or minus about 1 ounce.

10. The scale of claim 2, wherein the appendage is generally cylindrical and further includes two longitudinally extending directly opposed flat section on an exterior surface of the appendage.

11. The scale of claim 1, wherein the body further comprises three buttons: a first button adapted for turning the scale on and off; a second button for tarring the scale; and a third button for switching the display between displaying pounds and kilograms.

12. A combination comprising:
a bicycle stand for use in repairing or performing maintenance on a bicycle, the bicycle stand including a tube clamp generally adapted for securing a tube of the bicycle therein; and
a scale for weighing a bicycle, the scale including a body, a hook and an appendage, the body including a weighing mechanism and a display, the hook coupled with the body, the appendage extending from the body and being securely clamped in the tube clamp.

13. The combination of claim 12, further comprising a bicycle, the bicycle being suspended from the hook.

14. The combination of claim 12, wherein the body includes a bottom side, the appendage comprises a generally cylindrical tube with an interior, and wherein the hook extends from a distal end of the appendage and is coupled to the body through the interior.

15. The combination of claim 12, wherein the scale has a capacity of at least 25 pounds and an accuracy of plus or minus about one ounce.

16. The combination of claim 12, wherein the appendage is adapted to be clamped in the tube clamp to prevent the scale from sliding relative to the bicycle stand when a bicycle weighing between 25–50 pound is hung from the hook.

17. A method of weighing a bicycle comprising:
securing an appendage of a scale in a tube clamp of a bicycle stand, the scale including (i) a body including a weighing mechanism and a display, (ii) a hook coupled with the body and (iii) the appendage extending from The body;

suspending the bicycle from The hook; and reading the weight of the bicycle as provided on the display.

18. The method of claim 17, wherein the bicycle is suspended by a top tube of a frame of the bicycle.

19. The method of claim 17, wherein the body further includes a semi-elastomeric or elastomeric over molded covering, and further comprising selecting the scale from a tool box.

20. The method of claim 17 further comprising:

tarring the scale after the bicycle has been suspended from the hook;

adding one or more new components or accessories to the bicycle; and reading the weight of the one or more components or accessories on the display.

* * * * *